(12) United States Patent
Wang et al.

(10) Patent No.: US 11,791,519 B2
(45) Date of Patent: Oct. 17, 2023

(54) BIODEGRADABLE TRANSIENT BATTERY BUILT ON CORE-DOUBLE-SHELL ZINC MICROPARTICLE NETWORKS

(71) Applicant: Wisconsin Alumni Research Foundation, Madison, WI (US)

(72) Inventors: Xudong Wang, Middleton, WI (US); Yutao Dong, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 51 days.

(21) Appl. No.: 17/501,490

(22) Filed: Oct. 14, 2021

(65) Prior Publication Data

US 2022/0123437 A1    Apr. 21, 2022

Related U.S. Application Data

(60) Provisional application No. 63/093,860, filed on Oct. 20, 2020.

(51) Int. Cl.
*H01M 50/469* (2021.01)
*H01M 50/107* (2021.01)
(Continued)

(52) U.S. Cl.
CPC ........... *H01M 50/469* (2021.01); *H01M 4/38* (2013.01); *H01M 4/622* (2013.01); *H01M 6/02* (2013.01);
(Continued)

(58) Field of Classification Search
CPC .... H01M 50/469; H01M 50/107; H01M 4/38; H01M 4/622; H01M 6/02; H01M 6/34; H01M 2004/022
See application file for complete search history.

(56) References Cited

U.S. PATENT DOCUMENTS 10,367,205 B2 * 7/2019 Kim .................. H01M 4/666
2016/0050750 A1 * 2/2016 Rogers ............... H05K 3/285
361/767
(Continued)

OTHER PUBLICATIONS

Lee et al. (J. Chem. Eng. 366. p. 62-71 (2019)) (Year: 2019).*
(Continued)

*Primary Examiner* — Brian R Ohara
*Assistant Examiner* — Emily Elizabeth Freeman
(74) *Attorney, Agent, or Firm* — Boyle Fredrickson S.C.

(57) ABSTRACT

A transient or biodegradable battery is provided having a filament structure that limits the speed of reaction allowing for a longer duration of battery power with a controlled current limit. In one embodiment, the filament may be constructed of zinc microparticles or nanoparticles having a thin outer insulation whereby a chemical reaction at the center core results in the progressive disintegration of the insulation revealing more core material. In one embodiment, microparticles or nanoparticles are coated with outer layers of chitosan and $Al_2O_3$ nanofilms, respectively, with designable discharge current and battery lifespan by controlling the exposed cross-sectional area of the zinc microparticle center core and the length of the filament, respectively. This novel structure of biodegradable battery provides improved control of battery life and power output, providing a promising solution to power transient medical implants.

20 Claims, 4 Drawing Sheets

(51) Int. Cl.
    *H01M 4/38*     (2006.01)
    *H01M 4/62*     (2006.01)
    *H01M 6/02*     (2006.01)
    *H01M 6/34*     (2006.01)
    *H01M 4/02*     (2006.01)

(52) U.S. Cl.
    CPC ........... *H01M 6/34* (2013.01); *H01M 50/107* (2021.01); *H01M 2004/022* (2013.01)

(56) References Cited

U.S. PATENT DOCUMENTS

2018/0183121 A1\*   6/2018   Dansie ................... H01M 4/622
2019/0081346 A1\*   3/2019   Yun ................... H01M 10/4235

OTHER PUBLICATIONS

Cheng et al., "Recent Development of Transient Electronics", Theoretical and Applied Mechanics Letters 6 (2016) 21-31.
Stauss et al., "Biocompatible Batteries—Materials and Chemistry, Fabrication, Applications, and Future Prospects", Bull. Chem. Soc. Jpn. 2018, 91, 492-505.

\* cited by examiner

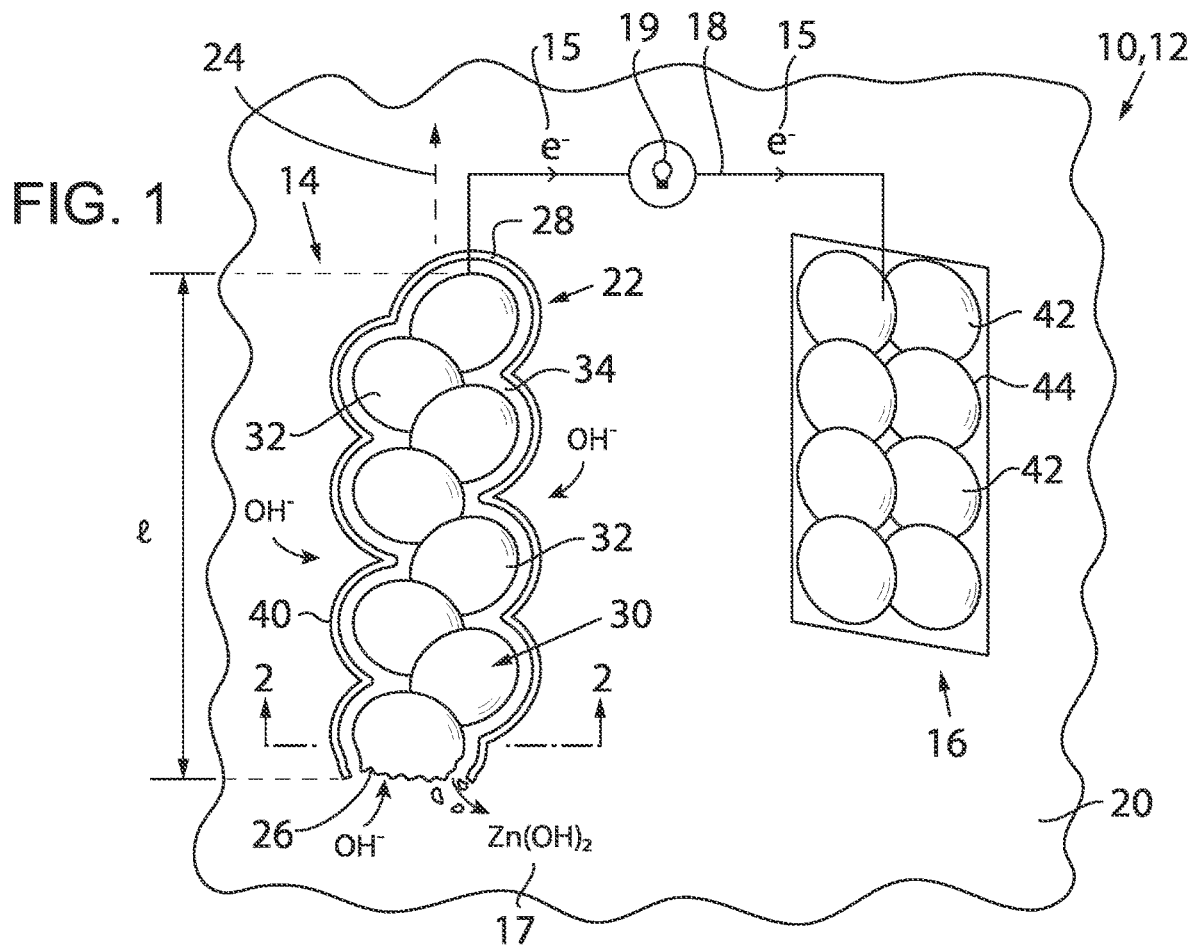
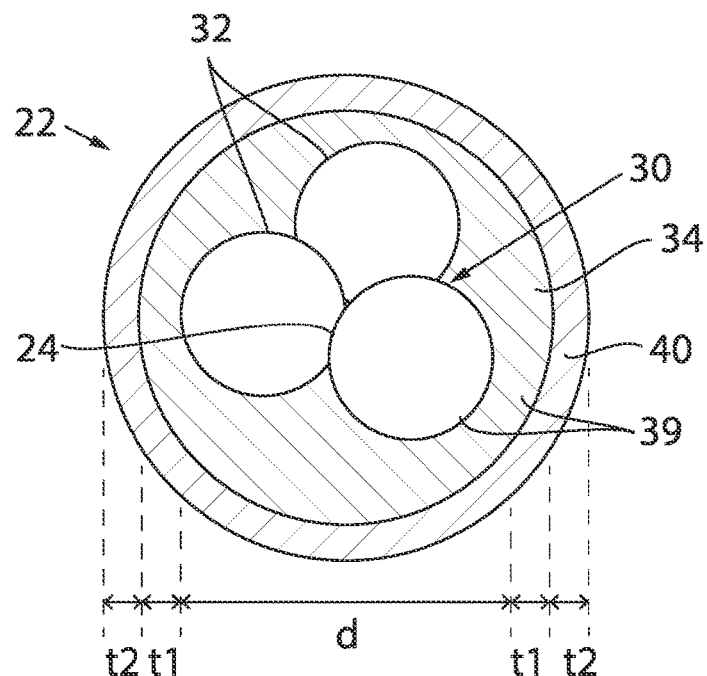

BIODEGRADABLE TRANSIENT BATTERY BUILT ON CORE-DOUBLE-SHELL ZINC MICROPARTICLE NETWORKS

CROSS REFERENCE TO RELATED APPLICATION

This application claims the benefit of U.S. Provisional Application No. 63/093,860, filed Oct. 20, 2020, hereby incorporated by reference.

STATEMENT REGARDING FEDERALLY SPONSORED RESEARCH OR DEVELOPMENT

This invention was made with government support under DE-SC0020283 awarded by the US Department of Energy. The government has certain rights in the invention.

BACKGROUND OF THE INVENTION

The present invention relates to transient electronics that dissolve within a predetermined amount of time, and more particularly, a transient energy source or battery that can dissolve after use.

Transient electronics or biodegradable electronics are an emerging class of electronics that can completely dissolve within a predetermined amount of time after stable function. Upon the exposure to electronic signals, light, temperature, shock or pressure changes, and chemical processes and the like, transient electronics disintegrate while releasing biologically and environmentally benign byproducts. Thus, transient electronics may be used as environmentally friendly alternatives with many applications.

There is an increasing interest in using transient electronics for biomedical implants for therapeutic or diagnostic functions since there are no harmful byproducts released into the body and they can be a less intrusive alternative to permanently implanted devices. Biomedical implants can be used in the diagnosis, monitoring and treatment of diseases, drug delivery, tissue regeneration and the like which may only require stable functioning for a predefined amount of time. Because these biomedical implants are transient and will safely dissolve without harmful byproducts, they also solve the problem of eliminating these implants after use without additional surgical removal or recollection of devices.

Many electronic biomedical implants, for example, cardiac pacemakers, defibrillators and neurostimulators, may require power supply sources or batteries which allow their operation to be self-contained and operated within the body. However, conventional batteries for electronic medical implants and sensors are typically based on electrode materials and electrolytes which are not biocompatible and may have toxic or injurious effects on biological systems. Therefore, these batteries need special encapsulation (i.e., hermetic sealing) to protect the patient from harmful exposure and results in a large size battery with inherent limitations in size, lifespan and risk of bodily harm.

SUMMARY OF THE INVENTION

The present invention provides transient or biodegradable batteries having a filament structure that limits the speed of reaction allowing for a longer duration of battery power with a controlled current limit. In one embodiment, the filament may be constructed of zinc microparticles or nanoparticles having a thin outer insulation whereby a chemical reaction at the center core results in the progressive disintegration of the insulation revealing more core material. In one embodiment, microparticles or nanoparticles are coated with outer layers of chitosan and $Al_2O_3$ nanofilms, respectively, with designable discharge current and battery lifespan by controlling the exposed area of the zinc microparticle center core and the length of the filament, respectively. This novel structure of biodegradable battery provides improved control of battery life and power output, providing a promising solution to power transient medical implants.

Half-cell reactions occur when electrons are lost at an anode through oxidation, and correspondingly, those electrodes are consumed at a cathode. These half-cell reactions are useful in a zinc primary battery where a battery material (including zinc) acting as the anode is oxidized by dissolving in the surrounding fluid, for example, water ($H_2O$) with $OH^-$ ions. Once oxidized, the battery material disintegrates to produce free electrons and metal ions (byproducts). Because the battery material acting as the anode is conductive, the free electrons flow through the battery material from the anode to the cathode through an electrical connection, which also sends current through an external load, e.g., the medical implant that consumes the electric power. The flow of free electrodes from the anode to the cathode produces an electromotive force (EMF) or potential difference between the anode and the cathode.

The present invention utilizes half-cell reactions in order to power the zinc primary battery at a predefined power output by limiting the oxidation reaction rate (i.e., dissolution, disintegration, or degradation rates) of the anode to the exposed surface area of the zinc metal center core otherwise protected by an outermost insulating layer along the filament's length, and to a predefined discharge lifetime by changing the filament length to change the duration of the reaction. The reaction follows a time delayed path along the filament length, from a free tail end to an opposite attached end connected (via the electrical connection) to the cathode, similar to the time delay path of a fuse for explosives or fireworks which delays the time for the ignition to reach the explosive or firework.

In one embodiment of the present invention, a transient energy source includes an elongate filament extending along a filament axis having a central strand of a first battery material wherein the first battery material provides an uninterrupted electrically conductive path along the filament axis. A tubular sheath of an insulator surrounds the central strand along the filament axis. An electrical conductor communicates between a first end of the elongate filament and a second battery material. The central strand may be exposed in an electrolyte at a second end opposite the first end of the elongate filament so that a chemical reaction moves progressively primarily along the filament axis.

It is thus one feature of at least one embodiment of the present invention to control the degradation rate, direction, and sequence of the oxidation reaction at the anode to therefore provide improved control of the discharge current and lifespan of the battery.

The anode may be a plurality of zinc microparticles or nanoparticles arranged along the filament axis.

It is thus one feature of at least one embodiment of the present invention to utilize zinc metal microparticles or nanoparticles as an anode metal that easily loses electrons in water and which has a moderate degradation rate, can circumvent undesirably local pH increase, and minimize gaseous hydrogen production.

The elongate filament may further comprise an intermediate sheath of a polymeric binder surrounding the elongate filament and held within the tubular sheath of the non-conductive polymer. The polymeric binder may be a water-soluble binder. The polymeric binder may be a thin layer of chitosan.

It is thus one feature of at least one embodiment of the present invention to permit the zinc microparticles or nanoparticles to be built into an elastic and flexible filament instead of on bulky foils or plates where the oxidation reaction takes place on the entire metal surface at the same time. The dissolution of the binder with the zinc microparticles or nanoparticles also assists with breaking away the $Al_2O_3$ outer layer.

The insulator may be frangible to break away from the elongate filament as the elongate filament is consumed. The insulator may be tens of nanometers thick. In one embodiment, the insulator is less than 1 μm thick and may be less than 50 nm thick and may be less than 40 nm thick and may be less than 30 nm thick and may be about 20 nm thick. The insulator may be a thin layer of $Al_2O_3$.

It is thus one feature of at least one embodiment of the present invention to block the permeation of $OH^-$ ions, water molecules, and other reactive substances through the outer shell from the surrounding solution but still allow the thin filament to shed its outer insulating shell to expose more of the central core through the forces of the oxidation reaction and the breakaway of the zinc microparticles or nanoparticles and polymeric binder.

The length of the elongate filament may be substantially proportional to a battery lifetime. The length of the elongate filament may be at least 1 mm and may be at least 5 mm and may be at least 50 mm extending along the filament axis.

It is thus one feature of at least one embodiment of the present invention to provide a desirable battery lifetime of at least a few hours and up to months of stable DC electricity adequate for powering small implantable electronics by increasing the amount of available metal reactant along the filament length.

A cross-sectional area of the elongate filament may be substantially proportional to a discharge current of the battery. The exposed cross sectional area of the elongate filament may be at least 0.01 $mm^2$.

It is thus one feature of at least one embodiment of the present invention to provide a desirably discharge current of at least 0.001 mA and may be at least 0.006 mA and may be at least 0.01 mA and may be at least 0.025 mA adequate for powering small implantable electronics by increasing the exposed area of the elongate filament for instantaneous oxidation reaction.

An electrolyte solution may interact with the anode at the exposed second end of the central strand to elicit an oxidation reaction causing the loss of electrons by the anode. The electrolyte solution may be a saline solution or a biofluid.

It is thus one feature of at least one embodiment of the present invention to permit the implantation of the biomedical implant within the human body to function as a naturally occurring zinc primary battery converting a chemical reaction into usable electricity. Various biofluids such as gastric acid, blood, saliva, and urine can be used as the electrolyte to activate the zinc primary battery.

In one embodiment of the present invention, a method of forming an elongate filament may include: forming a first battery material into a central strand extending along a filament axis wherein the first battery material provides an uninterrupted electrically conductive path along the filament axis; surrounding the central strand with a tubular sheath of an insulator along the filament axis and forming an outermost layer of the elongate filament; connecting a first end of the elongate filament to an electrical conductor; and connecting the electrical conductor to a second battery material. The central strand may be exposed in an electrolyte at a second end opposite the first end of the elongate filament so that a chemical reaction moves progressively primarily along the filament axis.

It is thus one feature of at least one embodiment of the present invention to allow the flexible filament to be cast on a flat substrate in a desired pattern to achieve flexible control of the battery lifetime and current output.

The metal particles may be zinc microparticles or nanoparticles. Molding the metal microparticles or nanoparticles into the elongate filament may be through an electrochemical sintering process. The elongate filament may be formed within a cylindrical mold.

The method may further comprise the step of submerging the metal microparticles or nanoparticles in the electrolyte.

The method may further comprise the step of surrounding the central strand of the zinc microparticles or nanoparticles with an intermediate sheath of a polymeric binder extending along the filament axis and further surrounded by the tubular sheath of non-conductive polymer.

Multiple transient energy sources may be attached in series to increase the voltage output.

These particular objects and advantages may apply to only some embodiments falling within the claims and thus do not define the scope of the invention.

BRIEF DESCRIPTION OF THE DRAWINGS

FIG. 1 is a schematic representation of one embodiment of the present invention showing a transient battery arrangement providing an anode, a cathode, an electrolyte surrounding the anode and the cathode to receive ions, and an electrical connection between the anode and the cathode permitting the flow of electrons from the anode to the cathode;

FIG. 2 is a schematic cross-sectional representation of a center core of a zinc microparticle filament of the transient battery of FIG. 1 and further coated with an intermediate binding layer of chitosan and an outermost insulation layer of $Al_2O_3$ protecting the center core of zinc microparticles or nanoparticles from contacting the electrolyte along the filament length;

DETAILED DESCRIPTION OF THE PREFERRED EMBODIMENT

Figure 3:
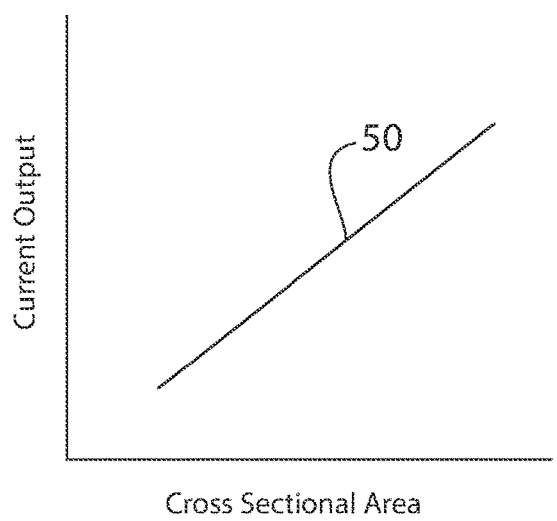
FIG. 3 is a line graph showing the approximately linear relationship between the filament length and the battery lifetime.

Referring to FIG. 1, a battery 10 for use with the present invention is defined by a zinc primary battery 12 (or a series of zinc primary batteries 12) having an anode 14 electrically communicating with a cathode 16 via an electrical conductor 18, and submerged within an electrolyte solution 20. The electrolyte solution 20 may be water, salts such as sodium chloride, and other solvents.

When the anode 14 is oxidized by dissolving (undergoes an oxidation reaction) in the electrolyte solution with $OH^-$ ions 20, the anode 14 produces free electrons 15 and metal ions 17 that are dissolved in the electrolyte solution 20 without harmful biological effects. The free electrons 15 pass from the anode 14 to the cathode 16 through the electrical conductor 18 to produce an electrical current, which can be used to power an external load 19. The external load 19 may be an electronic device. In one embodiment, this zinc primary battery 12 arrangement may be used within the human body to provide an energy source to self-powered biomedical implants as further described below.

Referring to FIGS. 1 and 2, the anode 14 of the zinc primary battery 12 may be formed by a biodegradable filament 22 having a generally elongate shape with a generally oblong or circular cross section, for example, having an outer diameter of 0.1 to 5 mm and a cross-sectional area of 0.01 to 25 $mm^2$ and a length of 1 mm to 1000 mm extending along a longitudinal filament axis 24 of the biodegradable filament 22.

A free tail end 26 of the biodegradable filament 22 may provide an exposed metal surface of the biodegradable filament 22 to the electrolyte solution 20 to produce an oxidation half reaction at the biodegradable filament 22 anode 14. The exposed metal disintegrates as free electrons 15 and benign metal ions 17 are produced. The benign metal ions 17 (byproducts) accumulate near the free tail end 26 and eventually dissolve into the electrolyte solution 20 without harmful biological effects. A connected end 28 of the biodegradable filament 22, opposite the free tail end 26 of the biodegradable filament 22, is electrically connected to the electrical conductor 18 which allows the free electrons 15 to flow from the anode 14 to the cathode 16. The cathode 16 is connected to the opposite end of the electrical conductor 18 where the cathode 16 receives the free electrons 15.

An overall electrochemical reaction of the zinc primary battery 12 may be represented by the following chemical equations where the metal of the biodegradable filament 22 is zinc:

Anode: $Zn + 2OH^- \rightarrow Zn(OH)_2 + 2e^- (E_0 = -1.25\ V)$

Fluid: $Zn(OH)_4^{2-} \rightarrow ZnO + H_2O + 2OH^-$

Cathode: $\frac{1}{2}O_2 + H_2O + 2e^- \rightarrow 2OH^- (E_0 = 0.4\ V)$

Overall: $2Zn + O_2 + 2H_2O \rightarrow 2Zn(OH)_2 (E_0 = 1.65\ V)$

This electrochemical reaction will continue between the anode 14 and cathode 16 as long as the metal of the biodegradable filament 22 is available to be oxidized to produce free electrons 15, thus defining a battery lifespan or lifetime.

The biodegradable filament 22 may provide for a center filament-like core 30 of battery material, for example, metal particles 32, which are surrounded by two outer layers or protective shells. The metal particles 32 may be treated with acetic acid before sintering the metal particles 32 together within a mold to form an elongate strand. The porous network of metal particles 32 formed by sintering are generally oriented along the filament axis 24 to provide a conductive electrical pathway along the filament axis 24 and along a length of the biodegradable filament 22. In one embodiment, the filament-like core 30 may be approximately 0.1 mm to 5 mm in diameter (d) to provide a desirable cross-sectional area of 0.01 to 25 $mm^2$ and may be approximately 1 mm to 1000 mm in length (1) to form a desirable length of reactive metal particles 32.

In one embodiment, the metal particles 32 may be zinc microparticles or nanoparticles, each zinc microparticle or nanoparticle having a diameter of about 10 nm to 100 μm which are joined or fused by electrochemical sintering to form a porous network of zinc metal particles 32 along the length and across the width of the filament-like core 30. The zinc particles 32 will easily lose electrons (oxidize) when exposed to water therefore serving as a strong oxidizing agent.

The oxidation half reaction at the anode 14 may be represented by the following oxidation reaction of zinc ions to release two electrons: $Zn^{2+} + 2OH^- \rightarrow Zn(OH)_2$. The electrons released in this process travel through the electrical conductor 18 to the cathode 16 to promote the half-cell reaction $\frac{1}{2}O_2 + H_2O + 2e^- \rightarrow 2OH^-$ at the cathode 16.

The zinc particles 32 are known to have a moderate degradation rate (compared to, e.g., magnesium) which can circumvent undesirable local pH increases and minimizes gaseous hydrogen production. The zinc particles 32 also do not require an acidic environment to operate.

It is understood that other metal particles 32 such as magnesium, zinc, iron, and molybdenum that tend to lose electrons and undergo an oxidation reaction can be used with the present invention and are able to provide good biosafety and electrochemical activity.

Surrounding the metal particles 32 is an intermediate sheath 34 of a water-soluble binder, which may be used to enhance the adhesion, elasticity, flexibility and biocompatibility of the inner metal microparticle 32 network. A thin nanofilm layer of the intermediate sheath 34 may be deposited over the outer surfaces of the metal particles 32, migrating through the porous network of the metal particles 32 to cover all the microparticle outer surfaces. The intermediate sheath 34 strongly anchors the metal particles 32 to each other to form a three-dimensional network limiting the movement of the metal particles 32 and forming a stable, electrically continuous organic-metal composite framework. The intermediate sheath 34 is biodegradable to dissolve with the dissolution of the metal particles 32. In one embodiment, the intermediate sheath 34 may have a thickness that is less than 0.1 mm and between 20 nm and 0.1 mm surrounding the center filament-like core 30.

In one embodiment, the intermediate sheath 34 of water-soluble binder may be chitosan, a natural (organic) polycationic linear polysaccharide derived from chitin. Other natural water-soluble binders that may be used include alginate, pectin, cellulose, agarose, guar gum, agar, carrageenan, gelatin, dextran, xanthan, and other polymers and the like that provide a non-conductive, and continuous film around the metal particles 32 to assist with forming a network of metal particles 32 within the intermediate sheath 34.

Once the matrix 39 of metal particles 32 and the intermediate sheath 34 are dried and cut into elongate filaments of a desired size and length, the matrix 39 is surrounded by an outermost layer 40 of an insulating polymer to protect the metal particles 32 from penetrating fluid flow of the electrolyte solution 20 surrounding the biodegradable filament 22. A thin nanofilm layer of the outermost layer 40 may be deposited by atomic layer deposition to the outer surface of the matrix 39 to block the electrolyte solution 20 from penetrating the outermost layer 40 and thus reacting with the center filament-like core 30 of metal particles 32 along a length of the biodegradable filament 22. In one embodiment, the outermost layer 40 may have a thickness that is less than 1 μm and less than 50 nm and less than 40 nm and less than 30 nm and about 20 nm surrounding the matrix 39.

In one embodiment, the outermost layer 40 of insulating material may be amorphous aluminum oxide ($Al_2O_3$). Other insulating coatings that may be used as an outermost layer 40 include $ZrO_2$, $TiO_2$, $HfO_2$ or insulating polymers such as poly(lactic-co-glycolic acid) (PLGA), polylactic acid (PLA) and polycaprolactone (PCL) and the like that provide a non-conductive, insulating, temperature resistant nano film around the matrix 39 of the metal particles 32 and the intermediate sheath 34 to shield the metal particles 32 from oxidation except at the exposed free tail 26 of the biodegradable filament 22.

The resulting biodegradable filament 22 provides a center filament-like core 30 with double outer shell layers 34, 40 and which may have the following dimensions shown below in Table 1:

TABLE 1

| Outer diameter of filament 22 ($d + 2*t1 + 2*t2$) | Outer diameter of center core 30 (d) | Wall thickness of intermediate sheath 34 (t1) | Wall thickness of outermost layer 40 (t2) | Cross sectional area of exposed core 30 | Length of filament 22 (l) |
|---|---|---|---|---|---|
| 0.1 mm-5 mm | 0.1 mm-5 mm | 20 nm-0.1 mm | 20 nm-1000 nm | 0.01 $mm^2$-25 $mm^2$ | 1 mm-1000 mm |

The end of the free tail end 26 of the biodegradable filament 22 is exposed or "stripped" to remove the outermost layer 40 and expose the metal particles 32 at the free tail end 26 of the biodegradable filament to the electrolyte solution 20. The metal particles 32 oxidize using electrons from hydroxide ($OH^-$) ions or water molecules in the electrolyte solution 20 to provide a directional dissolution of the metal particles 32 from the free tail end 26 to the connected end 28 of the biodegradable filament 22. As the metal particles 32 oxidize, metal ions 17 are released into the electrolyte solution 20. Simultaneously, the outermost layer 40 is shed by the forces of the oxidation reaction to expose additional metal particles 32 to further sustain the oxidation reaction along the length of the filament 22. Therefore, a continuous supply of electric current is provided within a finite period of time dependent on the oxidation reaction rate (dissolution, disintegration, or degradation rate) of the metal particles 32 and the length of the biodegradable filament 22.

Referring to FIGS. 2 and 3, the cross-sectional area (taken perpendicular to the axis 24) of the center filament-like core 30 of metal particles 32, may define the exposed surface area available to react with the electrolyte solution 20. Therefore, the cross-sectional area of the center filament-like core 30 (and the cross-sectional area of the biodegradable filament 22) is approximately proportional (providing an approximately linear relationship 50) to the output current. Therefore, the cross-sectional area of the center filament-like core 30 (and biodegradable filament 22) may be designed to control the output current of the zinc primary battery 12.

Figure 4:
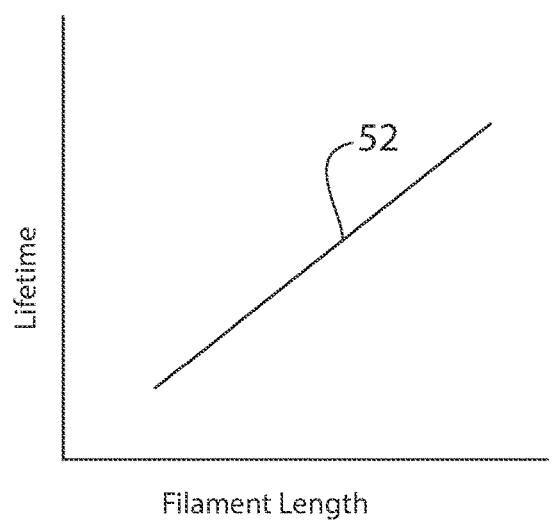
FIG. 4 is a line graph showing the approximately linear relationship between the cross-sectional area of the filament and the current output of the battery.

Referring to FIGS. 1 and 4, the center filament-like core 30 extends along the filament axis 24 to define the length of the center filament-like core 30 (the biodegradable filament 22 being nearly the same length as the center filament-like core 30). The length of the center filament-like core 30 defines the number or amount of metal particles 32 that are available to react with the electrolyte solution 20 to continue the oxidation reaction and is approximately proportional (providing an approximately linear relationship 52) to a lifetime of the battery 10. Therefore, the length of the center filament-like core 30 (and the biodegradable filament 22) can be designed to control the lifespan of the zinc primary battery 12.

Referring again to FIG. 1, the electrical conductor 18 may connect the anode 14 and the cathode 16 and may be a conductive wire that is biocompatible or has an outer insulation and able to conduct electrons from the anode 14 to the cathode 16 during the oxidation reaction at the anode 14. The connected end 28 of the biodegradable filament 22 is shielded by the outermost layer 40 to prevent oxidation at the connected end 28 and the connection of the electrical conductor 18 to the metal particles 32 at the connected end 28 is generally sealed, for example by epoxy, to prevent permeation of the electrolyte solution 20. The electrical conductor 18 may be a gold, zinc, or magnesium metal wires that are insulated from the electrolyte solution 20 by an insulative coating. The electrical conductor 18 may connect to the external load 19, e.g., an electronic device, to power the external load 19.

The cathode 16 of the zinc primary battery 12 may be formed by a second battery material such as metal particles 42 applied onto a polymer substrate 44. The metal particles 42 are biocompatible and may be harmless when dispersed, while the polymer substrate 44 may be biocompatible and biodegradable over a specified amount of time.

The metal particles 42 of the cathode 16, in this case, may be nonreactive gold in communication with the oxygen of the aqueous environment. Other metal particles 42 that may be used include iron, tungsten and molybdenum providing good biosafety and electrochemical activity.

The gold thin film may be plated onto a polymer substrate 44 of polycaprolactone which is a biodegradable polyester with a low melting point of around 60° C. and a glass transition temperature of about −60° C. It is understood that other polymer substrates 44 may be used such as polylactic acid (PLA), silk film, and polyhydroxybutyrate (PHB).

The anode 14 and the cathode 16 may be submerged in the electrolyte solution 20 which is an aqueous or molten solution that allows for the transport of reactants to the anode 14 and byproducts away from the anode 14. The outermost layer 40 promotes the current flow through the biodegradable filament 22 to the electrical conductor 18 instead of through the electrolyte solution 20.

Figure 5:
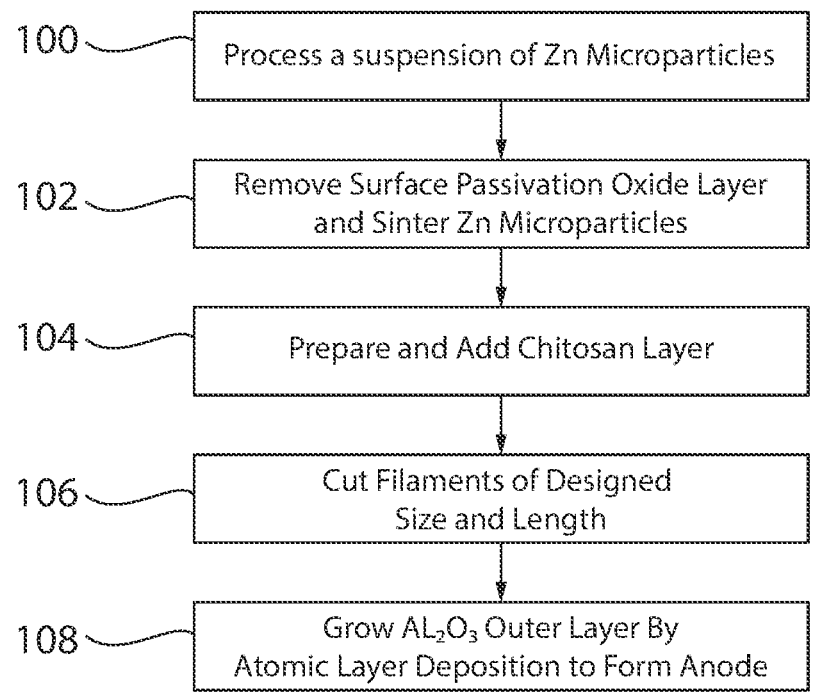
FIG. 5 is a flowchart illustrating a method of manufacturing the anode of the transient battery of FIG. 1.

Referring now to FIG. 5, a fabrication of the battery 10 or zinc primary battery 12 may be manufactured by producing an elongate Zn microparticle network with a double shell protective structure as the anode 14 as further described below.

In a first step represented by process box 100, the anode 14 may be produced by processing a suspension or slurry of metal particles 32, for example, including about 300 mg of zinc (Zn) microparticles (<10 μm, Sigma) and isopropyl alcohol (IPA) (≥99.0%, Sigma) solvent with a ratio of Zn:IPA=1:3 by weight. The suspension is stirred for approximately 10 minutes and then poured into a polydimethylsiloxane (PDMS) mold with a groove area of approximately 6 cm by 1 $cm^2$.

As represented by process box 102, after 2 minutes of sedimentation, 10% acetic acid (≥99.0%, Sigma) is dropped into the groove area of the PDMS mold and allowed to sit for 30 minutes in atmosphere and room temperature to clean the surface passivation oxide layer from the Zn microparticle surfaces and expose the bare metal surface. The dissolution of the surface passivation layer promotes the selfexchange between Zn and $Zn^{2+}$ at the Zn/water interfaces between the particles. The result "welds" the microparticles together into a percolating, conductive network through a sintering process.

As represented by process box 104, a 2 wt % chitosan/acetic acid solution is prepared by adding 0.4 g chitosan (85% DD, Fisher Scientific) into 20 mL 1% acetic acid with 4 hours of stirring. The 0.5 ml of the 2 wt % chitosan/acetic acid solution is dropped into the Zn groove area to enhance the Zn microparticle network and followed by air drying in atmosphere.

As represented by process box 106, the Zn-chitosan composite film is peeled off from the PDMS mold and cut into Zn-chitosan filaments with a designed length and width.

As represented by process box 108, an atomic layer deposition (ALD) technique is utilized to grow amorphous $Al_2O_3$ on the Zn-chitosan filaments. The ALD of $Al_2O_3$ is conducted at 90° C. using trimethylaluminum (TMA) and $H_2O$ as precursors. The pulsing time for TMA and $H_2O$ is 0.5 seconds and is separated by 30 seconds $N_2$ purging. A total of 200 cycles of ALD are implemented to grow 20 nm amorphous $Al_2O_3$ thin films on the Zn-chitosan filaments to adjust the water permeability of the Zn-chitosan filaments.

In one embodiment of the present invention, the biodegradable filament 22 may be casted onto a flat substrate in desired patterns.

Figure 6:
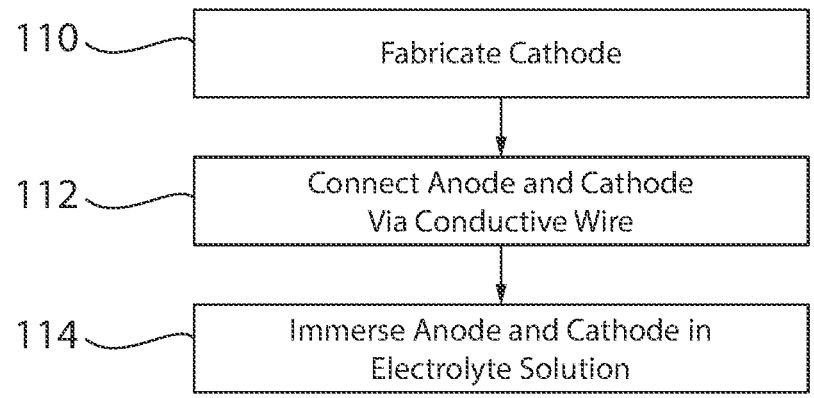
FIG. 6 is a flowchart illustrating a method of manufacturing the zinc primary battery arrangement of the transient battery of FIG. 1.

Referring now to FIG. 6, as represented by process block 110, the cathode 16 of the zinc primary battery 12 is fabricated by taking 1 g polycaprolactone (PCL)(Mw~70,000, Fisher Scientific) filler dissolved in 10 mL acetone and then cast onto a glass petri dish to be dried for 4 hours in water vapor heat to prepare a PCL biodegradable polymer film (~20 μm). The thin film cathode composed of 50 nm gold is deposited by sputtering (Leica EM ACE600) onto the PCL film.

As represented by process block 112, the zinc primary battery 12 is assembled by taking the Zn-Chitosan-$Al_2O_3$ anode 14 and the Au-PCL film cathode 16 and connecting them through a conductive wire 18 affixed by silver paste (EPO-TEK H20E). After being dried in a hood, the connection areas between the Zn-Chitosan-$Al_2O_3$ anode 14 and Au-PCL film cathode 16 and conductive wire 18 were encapsulated by epoxy.

As represented by process block 114, the Zn-Chitosan-$Al_2O_3$ anode 14 and Au-PCL film cathode 16 are immersed in an electrolyte solution 20, for example, 0.9% NaCl (≥99.0%, Sigma) saline to assemble a primary 10 battery under room temperature. Other electrolyte solutions 20 include phosphate-buffered saline (PBS) and other ionic liquids.

In some embodiments, the electrolyte solution 20 may be provided by the body's own biofluids. For example, gastric acid is mainly composed of hydrochloric acid (HCl), potassium chloride (KCl), sodium chloride (NaCl), and bicarbonate. Similarly, while blood plasma consists mostly of water (95% volume), it also contains various ions ($Na^+$, $Ca^{2+}$, $Mg^{2+}$, $HCO_3^-$, $Cl^-$, etc.).

Table 2 lists body fluids and their main components that have an electrolytic function, pH and viscosity values:

TABLE 2

| | Electrolytic components | Electrical Conductivity | pH | Viscosity |
|---|---|---|---|---|
| Gastric fluid | HCl, KCl, NaCl | ~5-15 mS $cm^{-1}$ | 1.5-3.5 | 1.7-9.3 mPa s* |
| Blood plasma | $Na^+$, $Ca^{2+}$, $Mg^{2+}$, $HCO_3^-$, $Cl^-$ | ~10-20 mS $cm^{-1}$ | 7.35-7.45 | 1.3-1.7 mPa s |
| Saliva | $Na^+$, $K^+$, $Ca^{2+}$, $Mg^{2+}$, $Cl^-$ | | 6.2-7.4 | 1.01-1.21 mPa s |
| Urine | $Na^+$, $K^+$, $Ca^{2+}$ | ~17 mS $cm^-$ | 5-7 | 1.07 cSt** |

*Fasted state
**Kinematic viscosity

Figure 7:
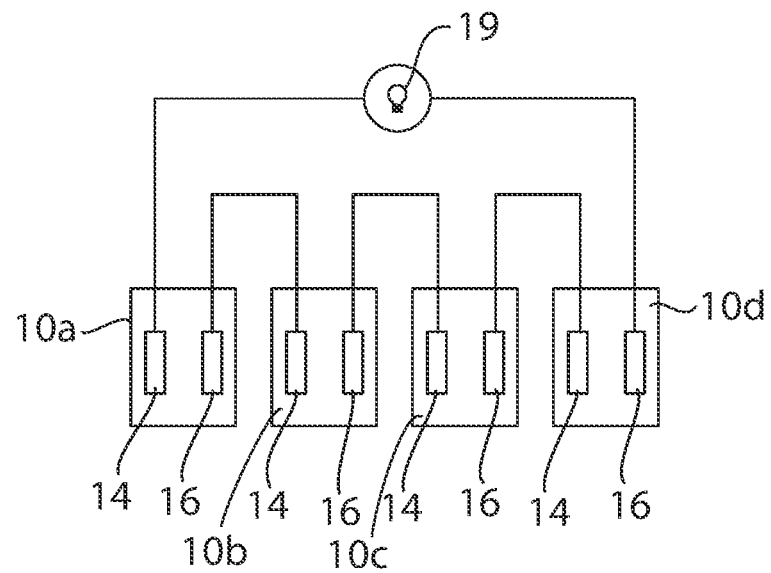
FIG. 7 is a schematic representation of multiple transient batteries of FIG. 1 attached in series in order to increase the voltage output.

Referring to FIG. 7 in some embodiments, multiple batteries 10 or zinc primary batteries 12 may be attached in electrical series to increase the voltage output. For example, the cathode 16 of a first battery 10a may be electrically connected to the anode 14 of a second battery 10b, the cathode 16 of the second battery 10b may be electrically connected to the anode 14 of a third battery 10c, the cathode 16 of the third battery 10c may be electrically connected to the anode 14 of a fourth battery 10d, and so forth, and the anode 14 of the first battery 10a and the cathode 16 of the fourth battery 10d may be connected to the external load 19. The connection of, e.g., two to four batteries 10a-10d in series, where the contribution of each of the batteries 10a-10d is about 0.5 V, results in a monotonic increase of the output voltage, namely, the voltage being approximately 1.0 V, 1.5 V and 2.0 V, respectively.

Figure 8:
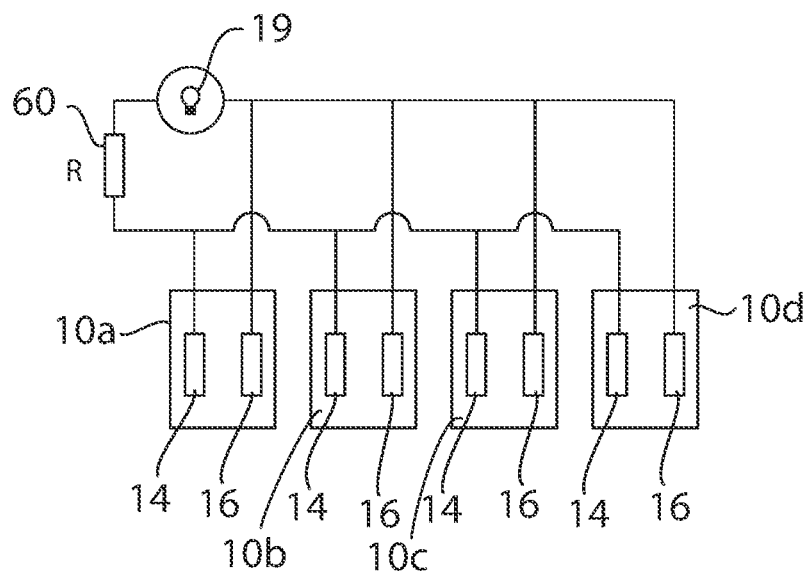
FIG. 8 is a schematic representation of multiple transient batteries of FIG. 1 attached in parallel in order to increase the current output.

Referring to FIG. 8, in an alternative embodiment, multiple batteries 10 or zinc primary batteries 12 may be attached in parallel in order to increase the discharge current of the output. For example, the anode 14 and cathode 16 of the first battery 10a may be connected in parallel to the anode 14 and cathode 16 of the second battery 10b, the anode 14 and cathode 16 of the third battery 10c, the anode 14 and cathode 16 of the fourth battery 10d, and so forth. The anode 14 and cathode 16 of the first battery 10a connects to the external load 19 and a resistor 60. The connection of, e.g., the two to four batteries 10a-10d in parallel, where the contribution of each of the batteries 10a-10d is 0.01 mA, results in a monotonic increase of the discharge current, namely, discharge current being approximately 0.02 mA, 0.03 mA, 0.04 mA, respectively.

The alternative method of increasing the discharge current is to increase the cross-sectional area of the center filament-like core 30 as previously described above.

Generally, the batteries 10 or zinc primary batteries 12 may be used as transient power sources for transient implantable electronics. The batteries 10 or zinc primary batteries 12 may provide a stable voltage output of 0.50 to 2.0 V and provide a stable current output of 0.001 mA to 0.025 mA, and single zinc primary battery may provide a stable voltage of approximately 0.55 V at a current of approximately 0.01 mA. A stable discharge time of more than a few hours and up to several months, e.g., 80 hours (for a 5 mm length filament 22) and at least one month (for a 50 mm length filament 22), may be provided. The maximum output power may be about 12 µW at 0.03 mA for one filament.

The batteries 10 or zinc primary batteries 12 may be used as biomedical implants in the following medical applications: neurostimulators, cochlear implants, cardiac resynchronization devices, cardioverter defibrillators, cardiac pacemakers, endoscopy capsules, muscle stimulators, drug stimulators, drug delivery system, and bone growth stimulators. The batteries 10 or zinc primary battery 12 may provide sufficient power and operation requirements to operate these devices under the required power and operation time requirements.

The operable power and operation time requirements may generally cover a range from $10^{-6}$ to $10^3$ mW and operation time of hours to weeks. For example, drug delivery requires tens of µW for an operation lifetime of about 6 hours; colon capsule endoscopy requires hundreds of µW for an operation lifetime of about 10 hours; and glucose sensor requires about 50 µW for an operation lifetime of about 4 hours.

In certain embodiments of the present invention, the batteries 10 or zinc primary batteries 12 may be used to produce pulses of electrical energy which may be delivered by constructing a biodegradable filament 22 with a center filament-like core 30 of metal particles 32 alternating with a different biodegradable material which dissolves but does not oxidize to deliver free electrons. As the biodegradable filament 22 is dissolved, current is delivered for periods that are interspersed with quiet periods of no current. In this respect, the generation of pulses may be integrated into the structure of the biodegradable filament 22 without a controller or microprocessor of a pulse generator.

The term "filament" refers to an elongate threadlike structure having a width less than 10 times and typically less than 100 times its length measured along a filament axis which may be straight or curved and twisted.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A transient energy source comprising:
an elongate filament extending along a filament axis having
a central strand of a first battery material wherein the first battery material provides an uninterrupted electrically conductive path along the filament axis;
a sheath of an electrical insulator surrounding the central strand along the filament axis; and
an electrical conductor communicating between a first end of the elongate filament and a second battery material;
wherein the central strand is exposed to an electrolyte at a second end opposite the first end of the elongate filament and electrically insulated between the first end and the second end to elicit a chemical reaction occurring progressively primarily along the filament axis from the second end to the first end.

2. The transient energy source of claim 1, wherein the first battery material is a plurality of zinc microparticles or a plurality of zinc nanoparticles arranged to provide an electrically conductive path along the filament axis.

3. The transient energy source of claim 1, wherein the insulator is frangible to break away from the elongate filament from the second end to the first end as the elongate filament is consumed.

4. The transient energy source of claim 3, wherein the sheath is less than 1000 nm in thickness.

5. The transient energy source of claim 4, wherein the insulator is a non-conductive polymer of aluminum oxide ($Al_2O_3$).

6. The transient energy source of claim 1, further comprising an intermediate sheath of polymeric binder surrounding the central strand and surrounded by the sheath.

7. The transient energy source of claim 6, wherein the polymeric binder is water-soluble chitosan.

8. The transient energy source of claim 1, wherein a length of the elongate filament is substantially proportional to a duration of power discharge time.

9. The transient energy source of claim 8, wherein a length of the elongate filament is at least 1 mm.

10. The transient energy source of claim 1, wherein a cross-sectional area of the elongate filament is substantially proportional to a discharge current.

11. The transient energy source of claim 10, wherein an exposed surface area of the elongate filament is at least 0.01 $mm^2$.

12. The transient energy source of claim 1, further comprising an electrolyte solution reacting with the first battery material at the second end of the central strand to cause a loss of electrons.

13. The transient energy source of claim 11, wherein the electrolyte solution is a biofluid.

14. A method of making a transient energy source comprising the following steps:

forming an elongate filament by
  forming a first battery material into a central strand extending along a filament axis wherein the first battery material provides an uninterrupted electrically conductive path along the filament axis;
  surrounding the central strand with a sheath of an electrical insulator along the filament axis and forming an outermost layer of the elongate filament;
connecting a first end of the elongate filament to an electrical conductor; and
connecting the electrical conductor to a second battery material;
wherein the central strand is exposed to an electrolyte at a second end opposite the first end of the elongate filament and electrically insulated between the first end and the second end to elicit a chemical reaction occurring progressively primarily along the filament axis from the second end to the first end.

15. The method of claim 14, wherein the first battery material is a plurality of zinc microparticles or a plurality of zinc nanoparticles arranged to provide an electrically conductive path along the filament axis.

16. The method of claim 15, wherein forming the plurality of zinc microparticles or the plurality of zinc nanoparticles into a central strand is through an electrochemical sintering process.

17. The method of claim 16, wherein forming the plurality of zinc microparticles or the plurality of zinc nanoparticles into the central strand is by molding the plurality of zinc microparticles or the plurality of zinc nanoparticles within a mold.

18. The method of claim 14, further comprising the step of submerging the first battery material in the electrolyte.

19. The method of claim 14, further comprising the step of surrounding the central strand with an intermediate sheath of polymeric binder which is further surrounded by the electrical insulator.

20. The method of claim 14, wherein multiple transient energy sources are attached in series to increase voltage output of the energy source.

\* \* \* \* \*